United States Patent
Luckey

[15] 3,691,705
[45] Sept. 19, 1972

[54] SELF-ERECTING COLLAPSIBLE AND FOLDABLE TUBULAR BEAM

[72] Inventor: George R. Luckey, Playa Del Rey, Calif.

[73] Assignee: TRW Inc., Redondo Beach, Calif.

[22] Filed: May 24, 1971

[21] Appl. No.: 146,187

[52] U.S. Cl. ................................................52/108
[51] Int. Cl. ...........................................F04h 12/18
[58] Field of Search........52/720, 726, 737, 738, 108; 242/54 A; 343/80, 81

[56] References Cited

UNITED STATES PATENTS 2,905,282  9/1959  Miller..........................52/108
3,434,254  3/1969  Rubin..........................52/108

Primary Examiner—Frank L. Abbott
Assistant Examiner—Carl Friedman
Attorney—Daniel T. Anderson, Donald R. Nyhagen and Jerry A. Dinardo

[57] ABSTRACT

A self-erecting collapsible and foldable articulated tubular beam having a pair of thin-walled resiliently flexible tubes joined end to end by spring loaded hinges in a manner such that the beam may be flattened and then folded to locate the flattened tubes in side by side relation, and the beam, when released, springs back to its normal expanded configuration under the action of elastic strain energy and hinge spring energy stored in the flattened and folded beam.

3 Claims, 3 Drawing Figures

PATENTED SEP 19 1972          3,691,705
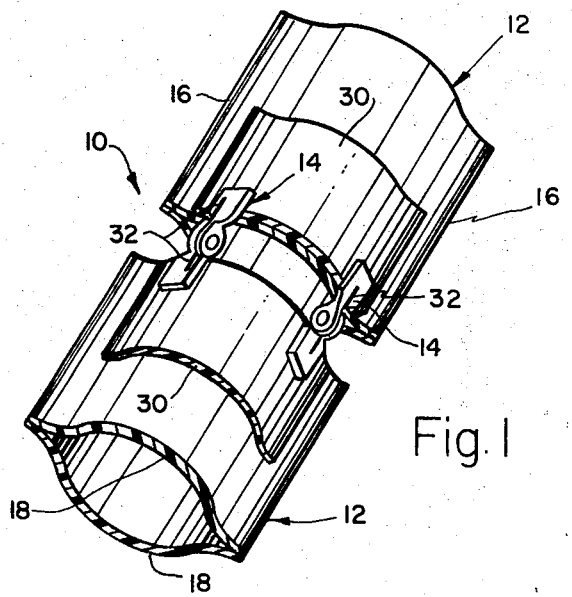
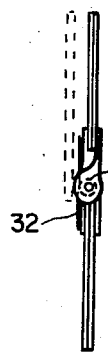
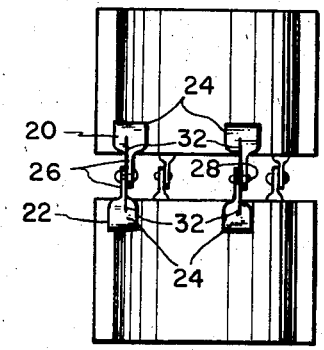
George R. Luckey
INVENTOR.
BY
ATTORNEY

SELF-ERECTING COLLAPSIBLE AND FOLDABLE TUBULAR BEAM

BACKGROUND OF THE INVENTION

1. Field of the Invention

This invention relates generally to collapsible structures and more particularly to an articulated tubular beam which may be flattened and folded to a collapsed configuration.

2. Prior Art

There is a continuing need for large truss structures and the like which can be collapsed for storage in greatly reduced volume and subsequently deployed to envelop a volume or form planar, curved or contoured surfaces for space or terrestrial uses. Large parabolic antennas which can be collapsed to a small volume for stowage in a space vehicle during launch into space orbit and then deployed are one such example. Maximum surface accuracy and minimum distortion due to mechanical loads and thermal gradients are fundamental requirements. The ultimate in design simplicity is also desired to ensure deployment reliability.

Many expandable structure concepts have been proposed to fulfill these needs. Inherent disadvantages, such as inability to maintain desired accuracy in operation, unreliable deployment, design and manufacture complexities, etc., however, have deterred their acceptance. One such concept proposed for space use, for example, is a truss reflector which exhibits good structural integrity and stability against thermal distortion, but possesses extreme mechanical complexity and hence low deployment reliability and high relative specific weight and cost. The above and other deficiencies of the existing expandable structures stem in large part from the fact that they are constructed of essentially rigid elements which are hinged to permit collapsing and deployment of the structures.

SUMMARY OF THE INVENTION

The present invention provides a flexible collapsible and foldable beam for collapsible truss structures and other uses. The beam has a pair of tubes constructed of relatively then resiliently flexible sheet material and including diametrically opposed coplanar flanges. These tubes are joined end to end by hinges which are spring loaded to bias the tubes into coaxial end to end relation. With the tubes expanded in this end to end relation, the axes of the beam hinges are disposed in mutually oblique relationship which tends to lock the tubes in position.

The beam is compressible to a flattened configuration wherein the beam tubes are flattened substantially into the planes of their flanges, and the hinge axes are disposed in coaxial end to end relation normal to the tube axes within the flange plane. When thus compressed, the beam is foldable about the aligned hinge axes against the bias of the hinge springs into a compact storage configuration wherein the flattened beam tubes are disposed in side by side relation. In this folded and flattened configuration, the stressed hinge springs and flattened beam tubes store elastic strain energy which unfolds the beam tubes back into end to end relation and restores the tubes to their normal expanded tubular configuration when released.

BRIEF DESCRIPTION OF THE DRAWINGS

In the drawings:

FIG. 1 is a perspective view of a present self-erecting collapsible and foldable tubular beam;

FIG. 2 is a side elevation of the beam in its flattened configuration; and

FIG. 3 is an edge view of the flattened beam illustrating in broken lines the beam in its folded configuration.

DESCRIPTION OF THE PREFERRED EMBODIMENTS

The self-erecting collapsible and foldable tubular beam 10 illustrated in the drawings has a pair of tubes 12 joined end to end by hinges 14. Tubes 12 are constructed of relatively thin, resiliently flexible sheet material, which may be a plastic material, such as heat treated Mylar or Kapton, or a metallic material, such as titanium. Each tube has coplanar, diametrically opposed flanges 16 and intervening normally arcuate wall portions 18. When free of any external forces, tubes 12 assume their normal expanded configuration of FIG. 1 wherein their wall portions 18 arch outwardly away from one another to form tubular shapes. The tubes are compressible to their flattened configuration of FIGS. 2 and 3 wherein the tube wall portions 18 are flattened substantially into the planes of their flanges 16. When thus compressed, the tubes store elastic strain energy which causes the tubes to spring back to their expanded tubular shape when released.

The beam hinges 14 are identical and each comprises a pair of similar rigid hinge members 20, 22 with flat mounting tabs 24 and flat tongues 26 in planes normal to the mounting tabs. Tongues 26 are disposed in side by side overlapping relation and are pivotally joined by a pivot 28. The hinge tabs 24 are adhesively bonded or otherwise secured to the tube wall portions 18. If desired, resiliently flexible reinforcing sheets 30 may be bonded to the tube wall portions beneath the hinge tabs to prevent tearing of the hinges from the tubes.

As shown best in FIG. 2, there are a pair of hinges 14 at each side of the beam 10. The two hinges at each side of the beam are laterally displaced or offset relative to the two hinges at the other side of the beam. The pivot axes of the hinges are located in a common plane passing midway between the adjacent ends of the tubes 12, normal to their longitudinal axes when the tubes are disposed in their normal coaxial end to end positions of FIG. 1. The hinges embody springs 32 for biasing the tubes to these latter positions. When the tubes are in their normal expanded tubular configurations of the latter figure, the hinge axes are disposed in mutual oblique relation, as shown, such that they effectively lack the tubes in coaxial end to end relation.

Hinges 14 are constructed and arranged on the tubes 12 in such a way that compression of the tubes to their flattened configuration of FIGS. 2 and 3 locates the hinge axes in coaxial relation within the flange planes of the tubes and normal to the tube axes. As a consequence, when the beam 10 is thus flattened, it may be folded about the aligned hinge axes to its folded configuration of FIG. 3. Folding of the beam in this fashion stresses the hinge springs 32 which thus tend to unfold the beam to its normal unfolded configuration of FIG. 1 when released.

It is now evident that when the beam 10 is free of external forces, it assumes its normal expanded tubular configuration of FIG. 1. The beam is compressible and foldable, by the application of external forces, to its flattened and folded configuration of FIG. 3. In this flat folded configuration, the tubes 12 and hinge springs 32 store elastic strain energy for restoring the beam to its tubular configuration of FIG. 1 when the beam is released.

What is claimed as new in support of Letters Patent is:

1. A hinged collapsible and foldable self-erecting tubular beam comprising:
    a pair of tubes constructed of relatively thin resiliently flexible sheet material and having diametrically opposed flanges in planes containing the tube axes and confronting arcuate wall portions between and joining the flanges, whereby the tubes may be compressed to a flat configuration wherein their arcuate wall portions are flattened substantially into their flange planes and the tubes store elastic strain energy for restoring the tubes to their normal expanded tubular shape when released:
    a plurality of hinges pivotally joining said tubes end to end on pivot axes which are disposed in mutually oblique angular relation in a plane normal to the beam axis when said beam is in its normal tubular configuration wherein said tubes have said normal tubular shape and are coaxially aligned end to end, whereby said hinges tend to lock said tubes in coaxial alignment; and
    said hinge axes entering into coaxially aligned relation in said flange planes when said tubes are compressed to said flattened configuration, whereby said beam may be flattened and folded about the aligned hinge axis to a compress folded configuration wherein the flattened beam tubes are disposed side by side and said tubes store elastic strain energy for restoring the tubes to their normal expanded tubular configuration when the beam is released.

2. A beam structure according to claim 1 wherein:
said hinges include springs which yieldably urge said tubes into coaxial end to end relation.

3. A beam structure according to claim 2 wherein:
there are a pair of hinges at each side of said tubes, and the hinges at one tube side are offset relative to the hinges at the other tube side.

* * * * *